United States Patent
Park et al.

(10) Patent No.: US 10,681,373 B2
(45) Date of Patent: Jun. 9, 2020

(54) INTER-PREDICTION METHOD AND DEVICE IN IMAGE CODING SYSTEM

(71) Applicant: LG ELECTRONICS INC., Seoul (KR)

(72) Inventors: Naeri Park, Seoul (KR); Sunmi Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/332,735

(22) PCT Filed: Sep. 21, 2017

(86) PCT No.: PCT/KR2017/010364
§ 371 (c)(1),
(2) Date: Mar. 12, 2019

(87) PCT Pub. No.: WO2018/056709
PCT Pub. Date: Mar. 29, 2018

(65) Prior Publication Data
US 2019/0238882 A1 Aug. 1, 2019

Related U.S. Application Data

(60) Provisional application No. 62/398,508, filed on Sep. 22, 2016.

(51) Int. Cl.
*H04N 11/02* (2006.01)
*H04N 19/52* (2014.01)
(Continued)

(52) U.S. Cl.
CPC ......... *H04N 19/52* (2014.11); *H04N 19/105* (2014.11); *H04N 19/176* (2014.11); *H04N 19/55* (2014.11); *H04N 19/70* (2014.11)

(58) Field of Classification Search
CPC .... H04N 19/52; H04N 19/105; H04N 19/176; H04N 19/55; H04N 19/70
(Continued)

(56) References Cited

U.S. PATENT DOCUMENTS 9,494,046 B2 * 11/2016 Janssen ............... F01D 3/04
2007/0177672 A1 * 8/2007 Yang ................... H04N 5/455
375/240.25
(Continued)

FOREIGN PATENT DOCUMENTS

KR 20120034042 A 4/2012
KR 10-2014-0096130 A 8/2014
(Continued)

*Primary Examiner* — Jayanti K Patel
*Assistant Examiner* — Richard B Carter
(74) *Attorney, Agent, or Firm* — Dentons US LLP

(57) ABSTRACT

An inter-prediction method according to the present invention comprises the steps of: deriving a first motion vector of a current block; deriving a first reference block with respect to a current subunit of the current block on the basis of the first motion vector, the current subunit being adjacent to a target boundary of the current block; deriving a second reference block with respect to the current subunit on the basis of a second motion vector of a neighboring block adjacent to the target boundary; and generating prediction samples on the basis of an illumination compensation (IC)-based weighted sum of the first reference block and second reference block. The present invention enables reduction of the amount of data of additional information as well as efficient illumination compensation-based inter-prediction and block boundary error reduction.

11 Claims, 15 Drawing Sheets

(51) Int. Cl.
*H04N 19/176* (2014.01)
*H04N 19/105* (2014.01)
*H04N 19/70* (2014.01)
*H04N 19/55* (2014.01)

(58) Field of Classification Search
USPC .......................... 375/240.15–240.16, 240.25
See application file for complete search history.

(56) References Cited

U.S. PATENT DOCUMENTS

| | | | |
|---|---|---|---|
| 2013/0128974 A1* | 5/2013 | Chien | H04N 19/105 375/240.15 |
| 2014/0003522 A1* | 1/2014 | Park | H04N 19/105 375/240.16 |
| 2015/0264395 A1 | 9/2015 | Tourapis et al. | |

FOREIGN PATENT DOCUMENTS

| KR | 10-2014-0123008 A | 10/2014 |
|---|---|---|
| KR | 10-1544158 B1 | 8/2015 |
| KR | 10-1553850 B1 | 9/2015 |

* cited by examiner

INTER-PREDICTION METHOD AND DEVICE IN IMAGE CODING SYSTEM

CROSS-REFERENCE TO RELATED APPLICATIONS

This application is the National Stage filing under 35 U.S.C. 371 of International Application No. PCT/KR2017/010364, filed on Sep. 21, 2017, which claims the benefit of U.S. Provisional Application No. 62/398,508 filed on Sep. 22, 2016, the contents of which are all hereby incorporated by reference herein in their entirety.

BACKGROUND OF THE INVENTION

Field of the Invention

The present invention relates to an image coding technique, and more particularly, to an inter-prediction method and device in an image coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and device for enhancing video coding efficiency.

The present invention also provides a method and device for improving prediction performance.

The present invention also provides a method and device for enhancing inter-prediction performance based on illumination compensation.

The present invention also provides a method for reducing a prediction error at a block boundary during inter-prediction.

The present invention also provides a method for reducing a prediction error at a block boundary during inter-prediction based on illumination compensation.

The present invention also provides a method for efficiently performing inter-prediction, while reducing the amount of data of additional information.

In an aspect, an inter-prediction method performed by an encoding device is provided. The inter-prediction method includes: detecting a reference block for a current block; deriving a first motion vector of the current block; deriving a first reference block for a current sub-unit of the current block based on the first motion vector, wherein the current sub-unit is adjacent to a target boundary of the current block; deriving a second reference block for the current sub-unit based on a second motion vector of a neighboring block adjacent to the target boundary; generating prediction samples based on illumination compensation (IC)-based weight-sum of the first reference block and the second reference block; and encoding prediction information and outputting encoded prediction information.

In another aspect, an encoding device for inter-prediction is provided. The encoding device includes: predictor detecting a reference block for a current block, deriving a first motion vector of the current block, deriving a first reference block for a current sub-unit of the current block based on the first motion vector, the current sub-unit being adjacent to a target boundary of the current block, deriving a second reference block for the current sub-unit based on a second motion vector of a neighboring block adjacent to the target boundary, and generating prediction samples based on illumination compensation (IC)-based weight-sum of the first reference block and the second reference block; and an entropy-encoder encoding prediction information and outputting encoded prediction information.

In another aspect, an inter-prediction method performed by a decoding device is provided. The inter-prediction method includes: deriving a first motion vector of a current block; deriving a first reference block for a current sub-unit of the current block based on the first motion vector, wherein the current sub-unit is adjacent to a target boundary of the current block; deriving a second reference block for the current sub-unit based on a second motion vector of a neighboring block adjacent to the target boundary; and generating prediction samples based on an illumination compensation (IC) based weighted-sum using the first reference block and the second reference block.

In another aspect, a decoding device for inter-prediction is provided. The decoding device includes: a receiving unit receiving an IC flag of a current block; and a predictor deriving a first motion vector of the current block, deriving a first reference block for a current sub-unit of the current block based on the first motion vector, wherein the current sub-unit is adjacent to a target boundary of the current block, deriving a second reference block for the current sub-unit based on a second motion vector of a neighboring block adjacent to the target boundary, and generating prediction samples based on an illumination compensation (IC) based weighted-sum using the first reference block and the second reference block.

According to the present invention, inter-prediction performance may be improved through illumination compensation.

According to the present invention, a prediction error at a block boundary may be reduced and inter-prediction performance may be enhanced.

According to the present invention, illumination compensation-based inter-prediction and block boundary error reduction may be performed, while reducing the data amount of additional information.

DESCRIPTION OF EXEMPLARY EMBODIMENTS

Figure 1:
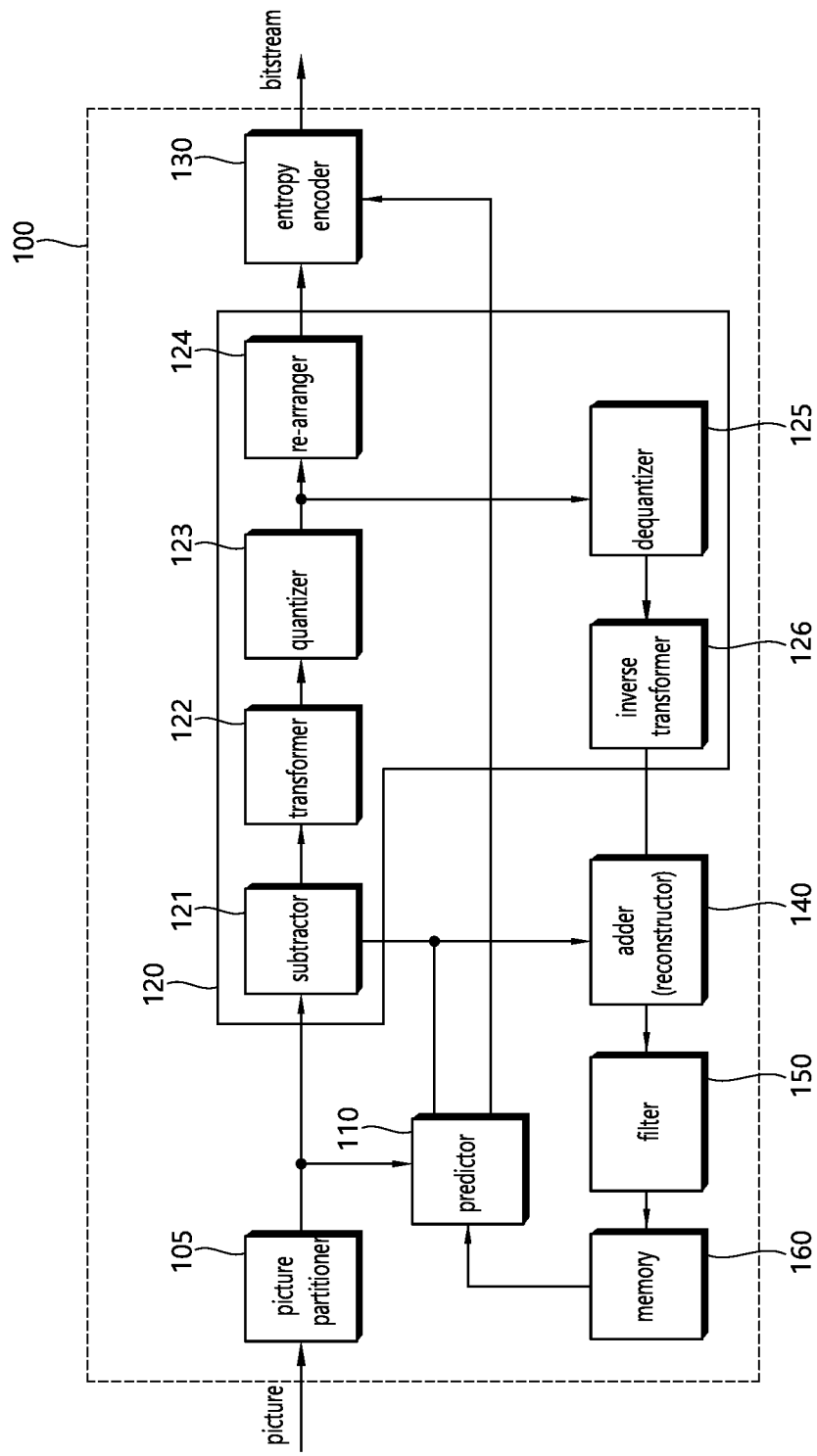
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 may include a picture partitioner 105, a predictor 110, a residual processor 120, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present invention may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
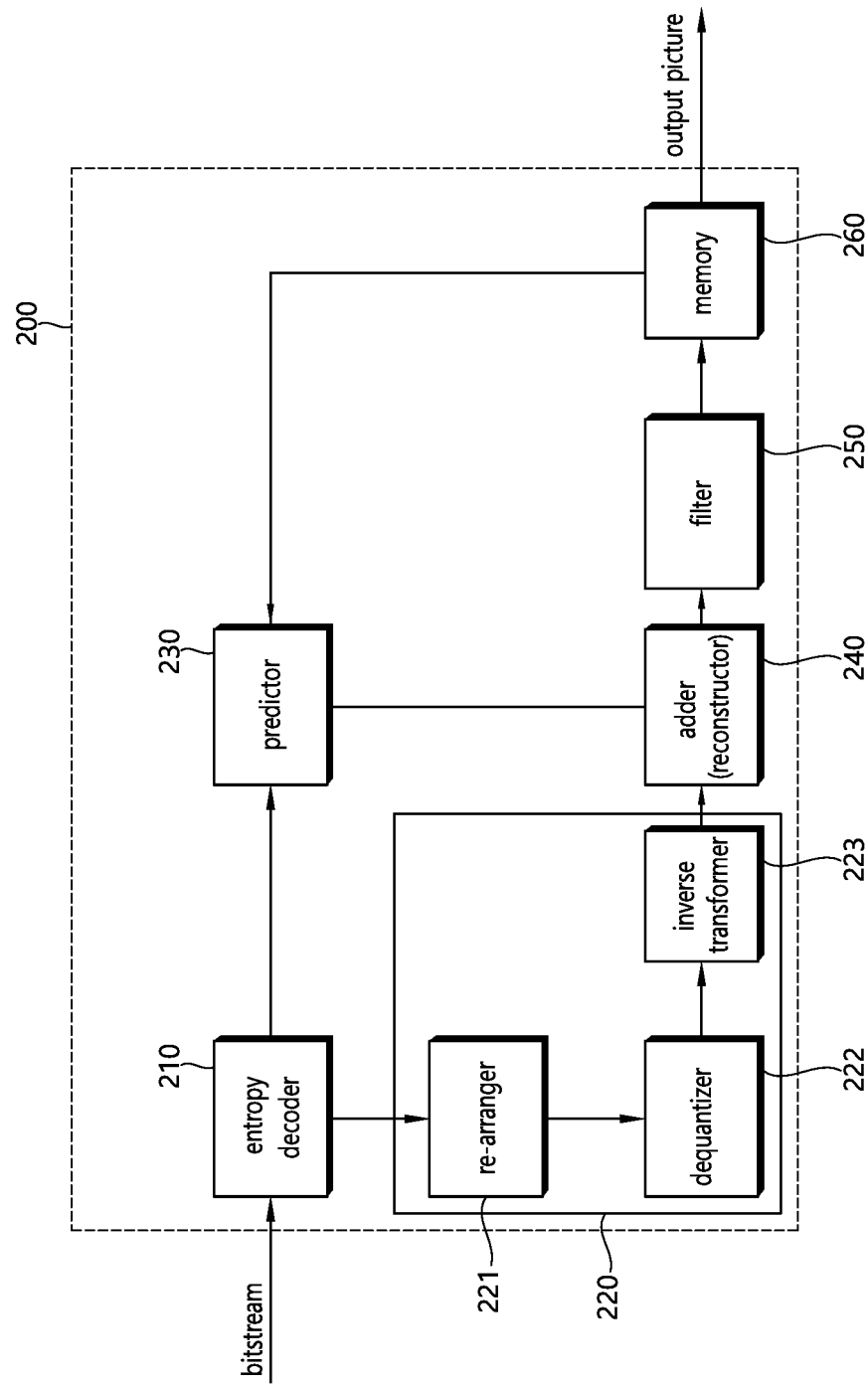
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 may include an entropy decoder 210, a residual processor 220, a predictor 230, an adder 240, a filter 250, and a memory 260.

The residual processor 220 may include a re-arranger 221, a dequantizer 222, an inverse transformer 223. Furthermore, the video decoding device 200 may include receiver (not depicted in the figure) receiving a bitstream comprising video information. The receiver may be configured as a separate component, or the receiver may be included in the entropy decoder 210.

When a bitstream including video information is input, the video decoding device 200 may reconstruct a video in association with a process by which video information is processed in the video encoding device.

For example, the video decoding device 200 may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding device. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding device.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor or reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, when inter-prediction is performed as described above, a predicted block including prediction samples for a current block may be generated. Here, the predicted block includes predicted samples in a spatial domain (or pixel domain). The predicted block may be derived similarly in the encoding device and the decoding device, and the encoding device may signal information about residual (residual information) between the original block and the predicted block, rather than an original sample value of the original block, to the decoding device, thus enhancing image coding efficiency. The decoding device may derive a residual block including residual samples based on the residual information, add the residual block and the predicted block to generate a reconstructed block including reconstructed samples, and generate a reconstructed picture including the reconstructed blocks.

However, when motion vectors of neighboring blocks in the current picture are different during inter-prediction, predicted samples are derived from reference blocks located in different regions (i.e., not adjacent to each other), having a tendency that discontinuity in the block boundary regions of the neighboring blocks increases. Such discontinuity may be considered a prediction error at the block boundaries. In order to compensate for the prediction error at the block boundaries, filtering may be performed on the block boundary region of the current block in consideration of relative positions of the adjacent block (neighboring block) and the current block. Specifically, for example, when the neighboring block is a left block of the current block and, a motion vector of the current block is MV1, and a motion vector of the neighboring block is MV2, filtering may be performed on the block boundary region of the current block by weighted-summing a reference block 1 derived based on the current block and MV1 and a reference block 2 derived based on a right block of the neighboring block and MV2. In another example, when the neighboring block is an upper block of the current block, the motion vector of the current block is MV1 and the motion vector of the neighboring block is MV2, filtering may be performed on the block boundary region of the current block by weighted-summing a reference block 1 derived based on the current block and MV1 and a reference block 2 derived based on a lower block of the neighboring block and MV2. This filtering may be termed overlapped boundary motion compensation (OBMC). In this case, the filtering may be applied in units of sub-blocks (sub-units) to the block boundary region of the current block. For example, n×n sub-units adjacent to the block boundary of the current block may be derived (e.g., n=4), and the above-described filtering may be applied in units of n×n sub-units.

Figure 3:
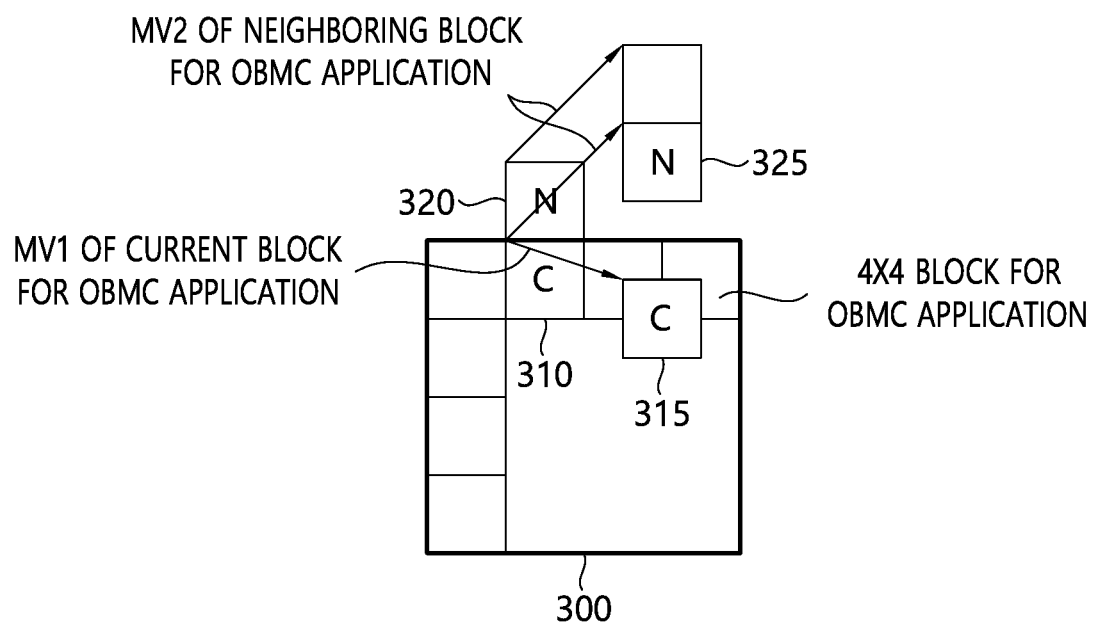
FIG. 3 illustrates an overlapped boundary motion compensation (OBMC) method according to an embodiment of the present invention.

FIG. 3 illustrates an OBMC method according to an embodiment of the present invention. FIG. 3 illustrates an example of performing OBMC on the left boundary of the current block when the motion vector of the current block is different from the motion vector of the left block adjacent to the current block.

Referring to FIG. 3, in performing inter-prediction on a current block 300, prediction samples may be derived from a reference block on a reference picture using a motion vector MV1 of the current block. In this case, specifically, a collocated block on the reference picture for the current block 300 may be derived, and a reference block having the same size as the current block located at coordinates shifted by MV1 from the collocated block may be derived, and reconstructed samples of the reference block may be used as prediction samples of the current block. In this case, according to the present invention, OBMC may be performed on a left boundary and/or an upper boundary of the current block 300. For example, when OBMC is performed on the upper boundary, a current sub-unit 310 adjacent to the upper boundary of the current block 300 and a neighboring subunit 310 adjacent to the upper side of the current sub-unit 310 and located within the upper block may be used. In this case, the current sub-unit 310 and the neighboring sub-unit 320 may have an n×n size. For example, motion information may be stored in units of 4×4 blocks, and in consideration of this, sub-units for OBMC application may have a size of 4×4.

Specifically, when OBMC is performed, a modified or filtered prediction samples regarding the current sub-unit 310 may be derived based on weighted summing (in units of samples) of a reference block 315 derived based on the current sub-unit 310 and the MV1 and a lower reference block 325 of a reference block derived based on the neighboring sub-unit 320 and MV2. In this case, weighting factors for the weighted summing may be used, and the weighted summing may be performed based on a phase of the samples. The weighting factors may be determined to be different based on distances from a target boundary.

In this manner, modified or filtered prediction samples may be derived by applying the same method to the other sub-units adjacent to the upper boundary and/or the left boundary in the current block 300. Here, for the purposes of description, the reference block 325 is represented as the lower reference block of the reference block derived based on the neighboring sub-unit 320 and the MV2, the reference block 325 may also be directly derived based on the current sub-unit 310 and the MV2. That is, the reference block 325 may represent the reference block 325 derived by applying MV2 on the reference picture based on the position of the current sub-unit 310. The same applies to the following. The reference block 315 may be referred to as a first reference sub-unit and the reference block 325 may be referred to as a second reference sub-unit. The OBMC method according to the present invention may be applied to a boundary portion of a CU unit or a PU unit. In the above-described embodiment, an example of performing OBMC based on n×n sub-units has been described. However, in performing OBMC, sub-units in use may include non-square sub-units, as well as square sub-units, in which case the size of the sub-units may be represented as w×h.

Meanwhile, when a light source or shadow exists in an image, illumination may locally change in an affected region. In this case, in performing inter-prediction, performance of prediction is reduced due to a difference in illumination between a current block of a current picture and a reference block of a reference picture. This is because a general motion estimation/compensation algorithm used in the inter-prediction process cannot compensate for such local change in illumination. Meanwhile, if such a local change in illumination is compensated, prediction may be performed more accurately.

Figure 4:
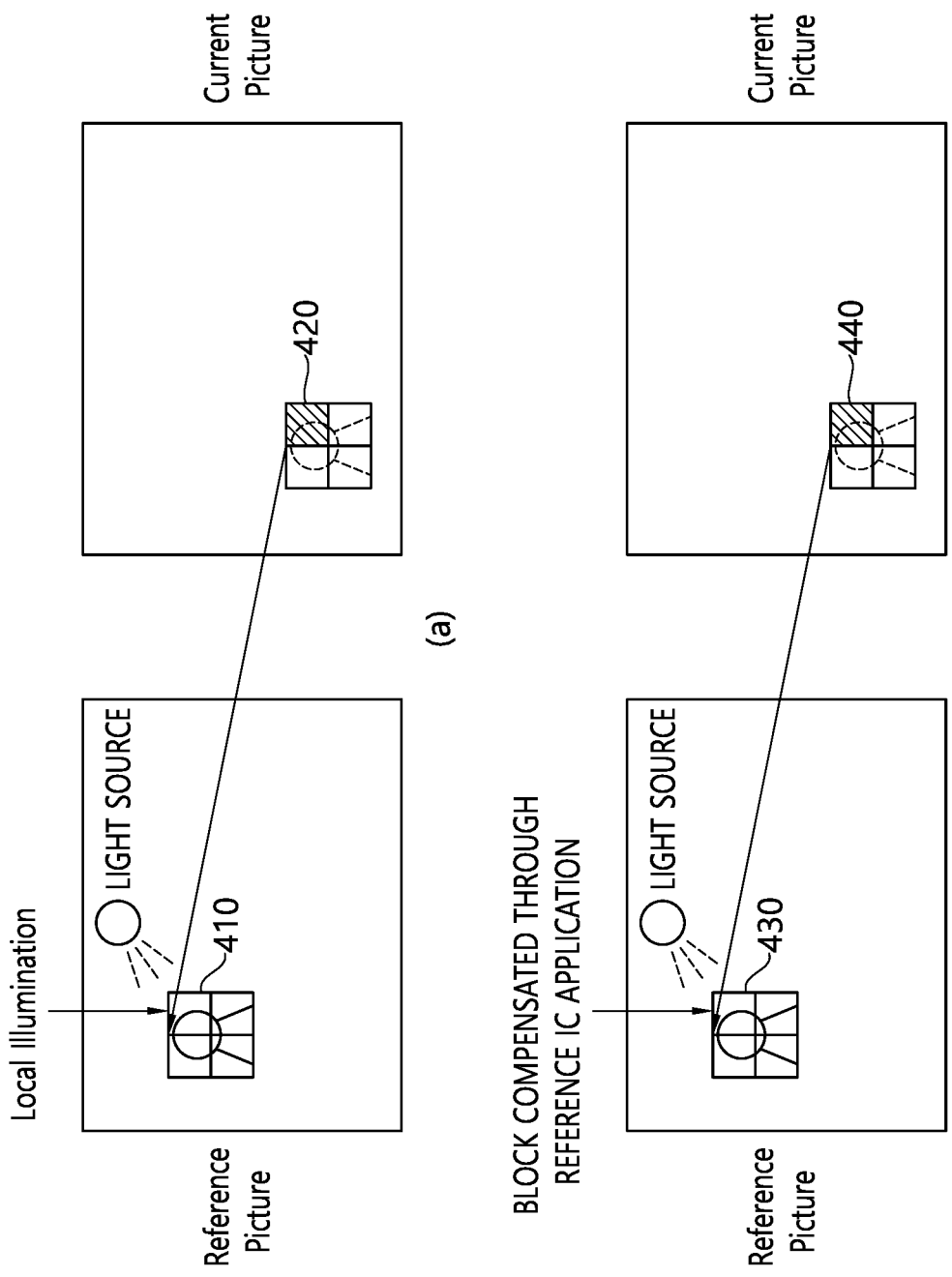
FIG. 4 illustrates examples of prediction with or without illumination compensation (IC).

FIG. 4 illustrates examples of prediction with or without illumination compensation (IC).

In FIG. 4(a), a block 410 of a corresponding reference picture may have locally high illumination due to a light source as compared with a current block 420 of the current picture as a target of (inter-)prediction. This may be caused due to a temporal difference between the current picture and the reference picture, a difference between positions of the objects of the current picture and positions of the objects of the reference picture and/or a difference in position between the reference block and the current block. In this case, the encoder may use the block 410 as a reference block for inter-prediction based on a rate-distortion (RD) cost or may use another nearby block as the reference block. In this case, however, prediction efficiency is lowered and a lot of data must be allocated to a residual signal.

Meanwhile, as illustrated in FIG. 4(b), efficiency of prediction may be increased by predicting a current block 440 based on a reference block 430 compensated by applying illumination compensation according to the present invention. In this case, the residual between the current block and the original block is reduced so that data allocated to the residual signal may be reduced and coding efficiency may be improved. The method of enhancing efficiency of prediction by compensating for illumination of the reference block may be termed local illumination compensation (LIC). The LIC may be used in combination with illumination compensation (IC).

As additional information for IC, an IC flag for indicating whether IC is applied or IC parameters for applying IC may be used. The IC parameters may include a scaling factor a and an offset b as described hereinafter. In order to increase efficiency of IC, it is important to improve prediction performance, while minimizing the additional information for IC. IC is based on a linear model and may be, for example, based on Equation 1 below.

$$\Sigma y = a \cdot \Sigma x + b \qquad \text{[Equation 1]}$$

Here, IC parameters a and b denote a scaling factor and an offset, respectively, and x and y denote a neighboring reference sample value of the reference block and a neighboring reference sample value of the current block used to derive the IC parameters, respectively. Alternatively, x and y may denote a reference sample value in the reference block and a sample value of the original block in the original picture corresponding to the current block used to derive the IC parameters, respectively. The reference block may be indicated based on a motion vector of the current block. In the IC parameter deriving process, a difference between the two sides of Equation 1 may be regarded as an error (E), and the IC parameters a and b satisfying a condition for minimizing the error may be obtained and applied to the reference block. That is, after the IC parameters are derived, reference samples (illumination-compensated) corrected by applying a scaling factor and an offset in units of samples to the reference samples of the reference block may be derived.

Since the IC parameters a and b to be obtained in Equation 1 are values that minimize errors of both sides, Equation 2 for obtaining the IC parameters may be expressed as follows $$E(a,b) = \Sigma_i (y_i - ax_i - b)^2 + \lambda(a-1)^2$$

Here, E(a, b) denotes values a and b minimizing an error, where i denotes indexing of each sample and λ (lambda) denotes a control parameter. The λ (lambda) may be previously determined or may be derived, for example, based on x. For example, it may be derived as $\lambda = (\Sigma_i x_i x_i >> 7)$, and in another example, λ may be set to 0 and the rear stage of Equation 2 may be omitted. This is also the same in the following equations.

Equation 2 above may be summarized as follows.

$$\begin{pmatrix} \sum_i x_i x_i + \lambda & \sum_i x_i \\ \sum_i x_i & \sum_i 1 \end{pmatrix} \begin{pmatrix} a \\ b \end{pmatrix} = \begin{pmatrix} \sum_i x_i y_i + \lambda \\ \sum_i y_i \end{pmatrix} \qquad \text{[Equation 3]}$$

Based on Equation 3, the IC parameters a and b may be derived as follows.

$$a = \frac{N \sum_i x_i y_i - \sum_i x_i \sum_i y_i + \lambda}{N \sum_i x_i x_i - \sum_i x_i \sum_i x_i + \lambda} \quad \text{[Equation 4]}$$

$$b = \sum_i y_i - a * \sum_i x_i \quad \text{[Equation 5]}$$

In Equation 4, N represents a normalization parameter. Here, N may be derived from the portion $$\sum_i 1$$

of Equation 3 above. For example, N may be determined based on the size of the current block (or reference block), and may be, for example, a value such as width·width or width+width of the corresponding block. Alternatively, N may be a value such as the width or width+n of the corresponding block.

In order to derive the IC parameters, 1) the reference sample in the reference block and the sample of the original block in the original picture corresponding to the current block may be used as described above, or 2) a neighboring reference sample of the reference block and a neighboring reference sample of the current block may be used.

When the IC parameters are obtained based on the reference sample in the reference block and the sample of the original block in the original picture corresponding to the current block as in 1) described above, relatively accurate parameters may be obtained. However, since the original picture may not be obtained at the decoder end, the IC parameters may be obtained at the encoder end and signaled to the decoder end, which increases the amount of data of additional information.

Meanwhile, when the IC parameters are obtained based on the neighboring reference samples of the reference block and the neighboring reference sample of the current block as in 2) described above, since IC parameters obtained using the relation of neighboring samples are used, accuracy of the IC parameters may be relatively lower as compared with the case of 1), but in the aspect of the decoder, the corresponding parameters may be directly obtained, without having to explicitly receive the IC parameters (i.e., a and b) from the encoder, and thus, it is advantageous in terms of coding efficiency.

According to the present invention, when the IC parameters are obtained based on the neighboring reference sample of the reference block and the neighboring reference sample of the current block, the following neighboring samples may be specifically used.

Figure 5:
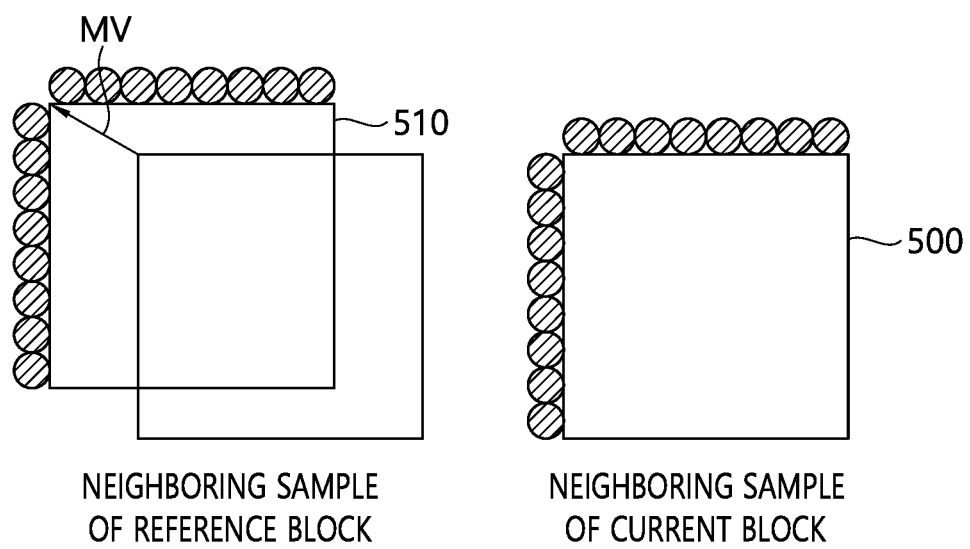
FIG. 5 is an example illustrating neighboring reference samples used for deriving IC parameters.

FIG. 5 is examples of neighboring reference samples used for deriving IC parameters.

Referring to FIG. 5, a case where left/upper neighboring samples of a current block 500 and left/upper neighboring samples of a reference block 510 are used as neighboring reference samples is illustrated. When a size of the current block 500 is N×N and a top-left sample position of the current block 500 is (0,0), positions of the left neighboring samples may include (−1,0), . . . , (−1, N−1) and positions of the upper neighboring samples may include (0, −1), . . . , (N−1, −1). If the size of the current block 500 is W×H, i.e., if the width and height are different, the positions of the left neighboring samples may include (−1,0), . . . , (−1, H−1), and the positions of the upper neighboring samples may include (0, −1), . . . , (W−1, −1).

Meanwhile, if both OBMC and IC are applied to the current block, the OBMC and the IC may be harmonized through the following method.

Figure 6:
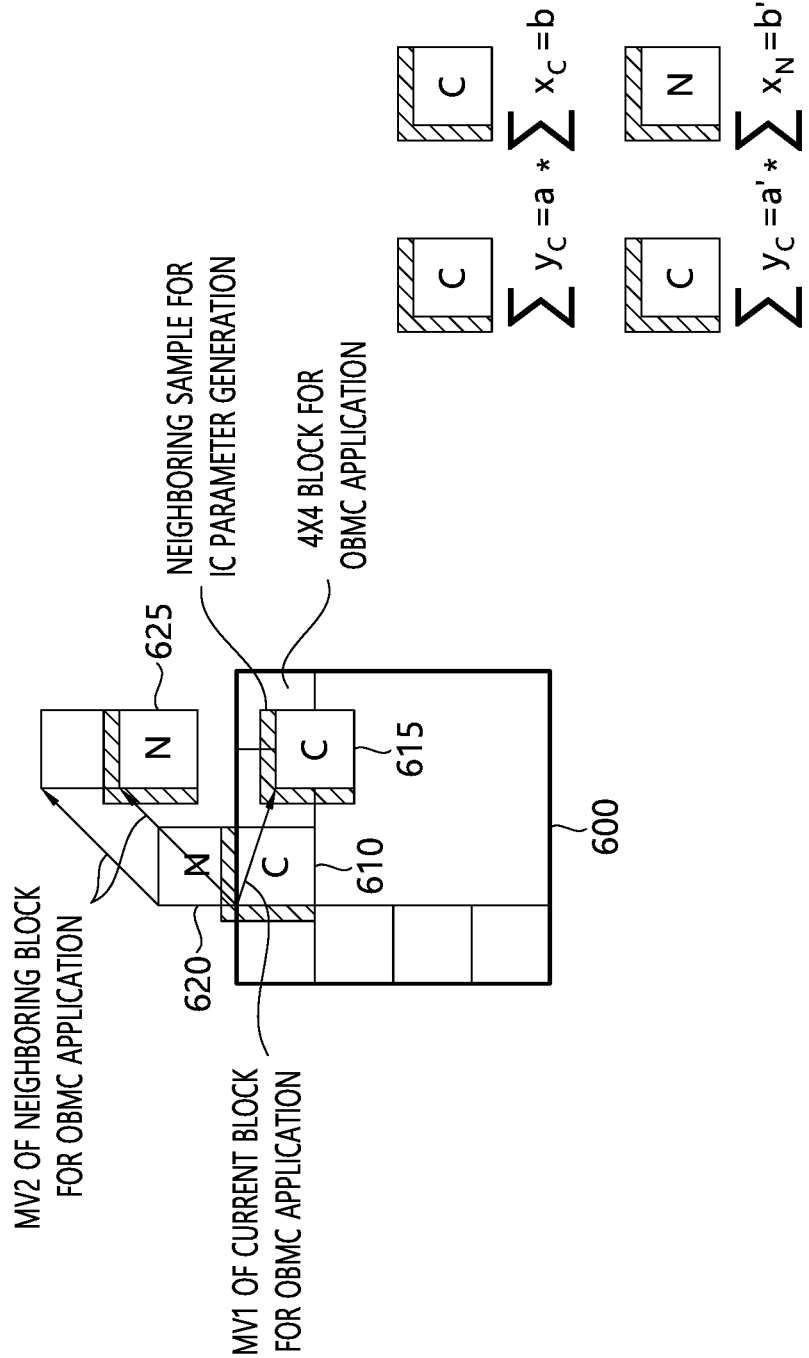
FIG. 6 illustrates an example of a method of harmonizing an OBMC and an IC according to the present invention.

FIG. 6 illustrates an example of a method of harmonizing OBMC and IC according to the present invention.

Referring to FIG. 6, IC may be applied in units of sub-units to the left boundary and/or the upper boundary of a current block 600, based on which OBMC may be performed. For example, when OBMC is performed as described above with reference to FIG. 3, a first reference block 615 may be derived based on a current sub-unit 610 and MV1 (MV of the current block) and a second reference block 625 may be derived based on the current sub-unit 610 and MV (MV of a neighboring block). Here, samples in the first reference block 615 and samples in the second reference block 625 may be used for deriving modified prediction samples of the current block, and the first reference block 615 may be referred to as a first prediction block 615 and the second reference block 625 may be referred to as a second prediction block 625. In addition, the samples in the first reference block 615 may be referred to as first prediction samples, and the samples in the second reference block 625 may be referred to as second prediction samples. The same applies to the following.

If an IC flag of the current block indicates true, that is, a value of 1, neighboring samples of the current sub-unit 610 and neighboring samples of the first reference block 615 may be used to derive a first IC parameter for the first reference block 615 and the neighboring samples of the current sub-unit 610 and neighboring samples of the second reference block 625 may be used to derive a second IC parameter for the second reference block 625. When a scaling factor of the first IC parameter is a and an offset thereof is b and a scaling factor of the second IC parameter is a and an offset thereof is b, the first reference block 615 and the second reference block 625 may be weighted-summed for OBMC as follows.

$$w \cdot (a \cdot x_C + b) + (1-w) \cdot (a' \cdot x_N + b') \quad \text{[Equation 6]}$$

Here, $x_C$ denotes a sample in the first reference block 615 and $x_N$ denotes a corresponding sample in the second reference block 625. W is a weighting factor, and the weighting factor may be determined to be different in units of rows/columns based on distances from a target boundary.

Meanwhile, according to the above-described method, since only the IC flag of the current block is considered in determining whether to apply IC, illumination change characteristics of the neighboring block are not reflected. In order to reflect the illumination change characteristics of the neighboring block, OBMC and IC may be harmonized as follows.

When OBMC is applied, an IC parameter for the first reference block derived by the MV of the current block, an IC parameter for the second reference block derived by the MV of the neighboring block, and an IC parameter of a prediction block searched using a motion vector of an adjacent block may be derived as follows. OBMC is a technique for eliminating discontinuity of a block boundary. Applying other IC parameters without considering illumination characteristics of actual adjacent neighboring blocks may make the prediction error at the boundary larger, and thus, an actually applied IC parameter of the neighboring block may be applied.

Figure 7:
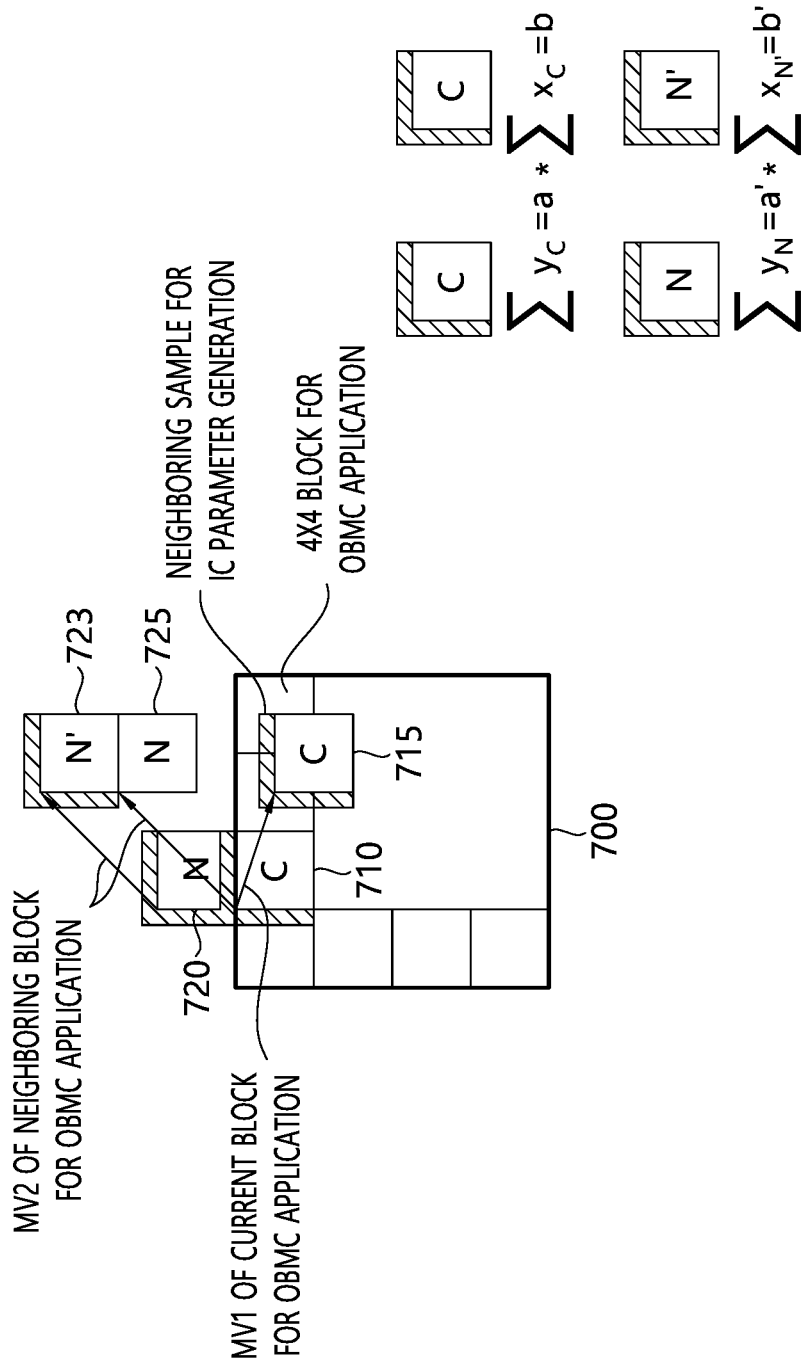
FIG. 7 illustrates another example of a method of harmonizing an OBMC and an IC according to the present invention.

FIG. 7 illustrates another example of a method of harmonizing OBMC and IC according to the present invention.

Referring to FIG. 7 IC may be applied in units of sub-units to the left boundary and/or the upper boundary of a current block 700, based on which OBMC may be performed. A first reference block 715 may be derived based on a current sub-unit 710 and MV1 (MV of the current block), and a second reference block 725 may be derived based on the current sub-unit 710 and MV2 (MV of a neighboring block). In addition, a third reference block 723 may be derived based on a neighboring sub-unit 720 and the MV2.

In this case, neighboring samples of the current sub-unit 710 and neighboring samples of the first reference block 715 may be used for deriving a first IC parameter for the first reference block 715, and neighboring samples of the neighboring sub-unit 720 and neighboring samples of the first reference block 725 may be used for deriving a second IC parameter for second first reference block 725. Accordingly, illumination characteristics of the neighboring block may be reflected and a prediction error in a block boundary region may be effective reduced. In this case, the first reference block 715 and the second reference block 725 may be weighted-summed as follows.

$$w \cdot (a \cdot x_C + b) + (1-w) \cdot (a' \cdot x_N + b') \qquad \text{[Equation 7]}$$

Here, a is a scaling factor of the first IC parameter, b is an offset of the first IC parameter, a' is a scaling factor of the second IC parameter, b' is an offset of the second IC parameter, $x_C$ is a sample in the first reference block 715, $x_N$ is a corresponding sample in the second reference block 725, and w is a weighting factor. The weighting factor may be determined to be different in units of rows/columns based on distances from a target boundary.

In this case, in order to calculate the IC parameter, the first reference block derived based on the current sub-unit and MV1, the second reference block derived based on the neighboring sub-unit, the current sub-unit, and MV2, and the third reference block derived based on the neighboring sub-unit and MV2 are required, the calculation process has high complexity. In order to reduce the complexity of the calculation process, OBMC and IC may be harmonized as follows.

Figure 8:
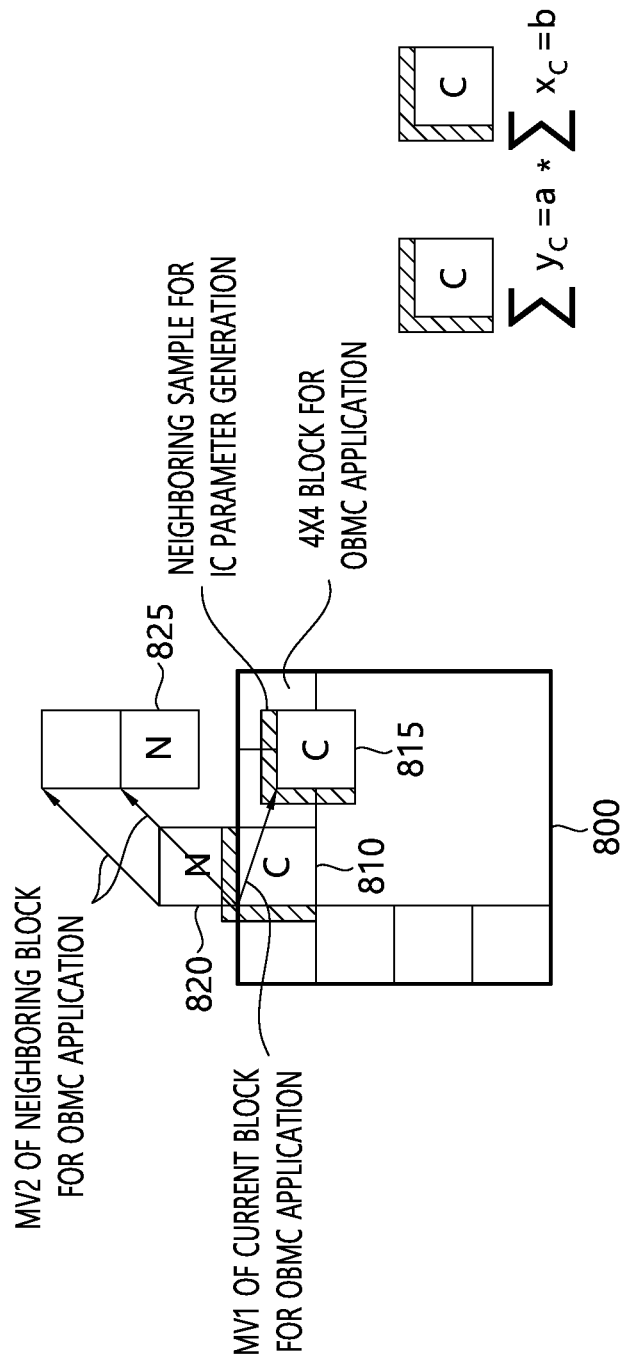
FIG. 8 illustrates another example of a method of harmonizing an OBMC and an IC according to the present invention.

FIG. 8 illustrates another example of a method of harmonizing OBMC and IC according to the present invention.

Referring to FIG. 8, IC may be applied in units of sub-units to the left boundary and/or the upper boundary of a current block 700, based on which OBMC may be performed. A first reference block 815 may be derived based on a current sub-unit 810 and MV1 (MV of the current block), and a second reference block 825 may be derived based on the current sub-unit 810 and MV2 (MV of a neighboring block).

In this case, neighboring samples of the current sub-unit 810 and neighboring samples of the first reference block 815 may be used for deriving a first IC parameter for the first reference block 815, and the first parameter may also be applied to the second reference block 825. Accordingly, complexity may be lowered. In this case, the first reference block 815 and the second reference block 825 may be weighted-summed as follows.

$$w \cdot (a \cdot x_C \cdot b) + (1-w) \cdot (a \cdot x_N + b) \qquad \text{[Equation 8]}$$

Here, a is a scaling factor of the first IC parameter, b is an offset of the first IC parameter, $x_C$ is a sample in the first reference block 815, $x_N$ is a corresponding sample in the second reference block 825, and w is a weighting factor. The weighting factor may be determined to be different in units of rows/columns based on distances from a target boundary.

When the IC flag is true, the methods described in FIGS. 7 and 8 may be applied, regardless of an IC flag of a neighboring block. Meanwhile, when the IC flag of the neighboring block is further considered, OBMC and IC may be performed as follows. Of course, the above-described embodiments and the embodiments described hereinafter may be combined.

If the IC flag of the current block is true (i.e., value 1) and the IC flag of the neighboring block is false (i.e., value 0) or if the IC flag of the current block is false and the IC flag of the neighboring block is true, OBMC may be applied in consideration of the IC flags of the corresponding blocks. FIGS. 9 to 13 illustrate methods of applying OBMC based on the IC flag of the current block and the IC flag of the neighboring block.

Figure 9:
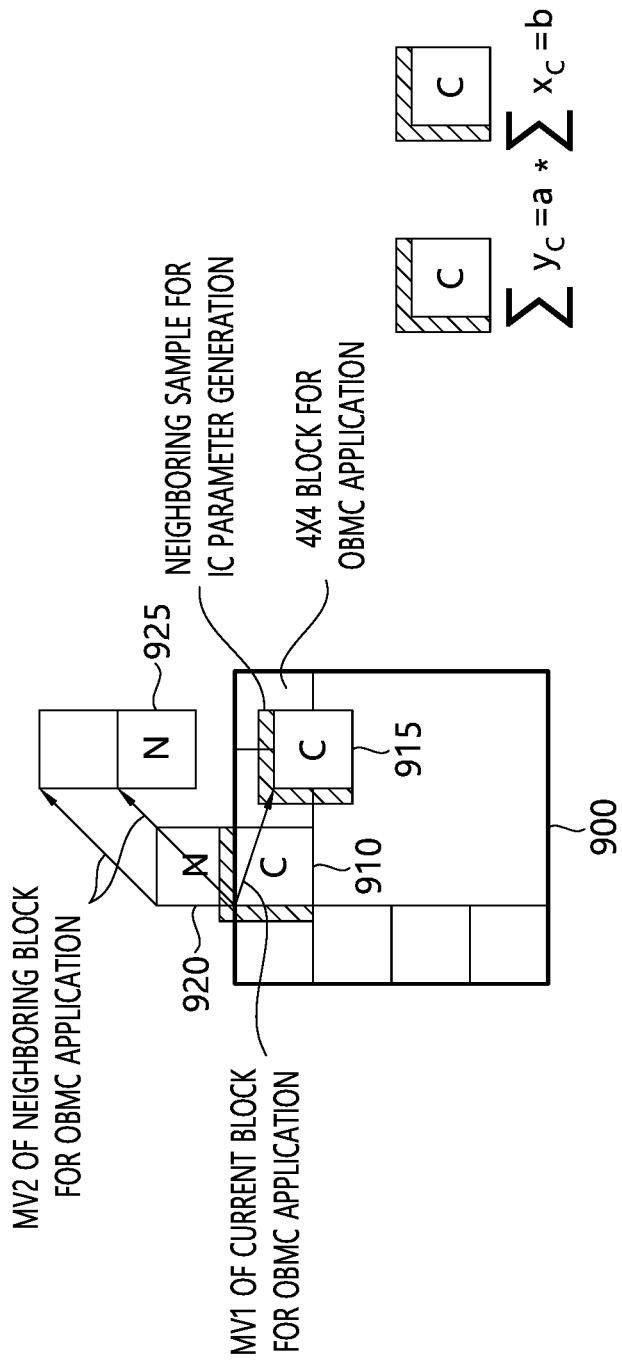
FIGS. 9 to 13 illustrate exemplary methods of applying OBMC based on an IC flag of a current block and an IC flag of the neighboring block.

FIG. 9 illustrates a case where an IC flag of a current block 900 is true and an IC flag of a neighboring block is false. In this case, an IC parameter is calculated based on neighboring samples of a current sub-unit 910 and neighboring samples of a first reference block 915. OBMC may be applied by applying the calculated IC parameter. In this case, IC may not be applied to the second reference block as illustrated in the following equation.

$$w \cdot (a \cdot x_C + b) + (1-w) \cdot (x_N) \qquad \text{[Equation 9]}$$

Here, a is a scaling factor of the IC parameter, b is an offset of the IC parameter, $x_C$ is a sample in the first reference block 915, $x_N$ is a corresponding sample in a second reference block 925, and w is a weighting factor. The weighting factor may be determined to be different in units of rows/columns based on distances from a target boundary.

Figure 10:
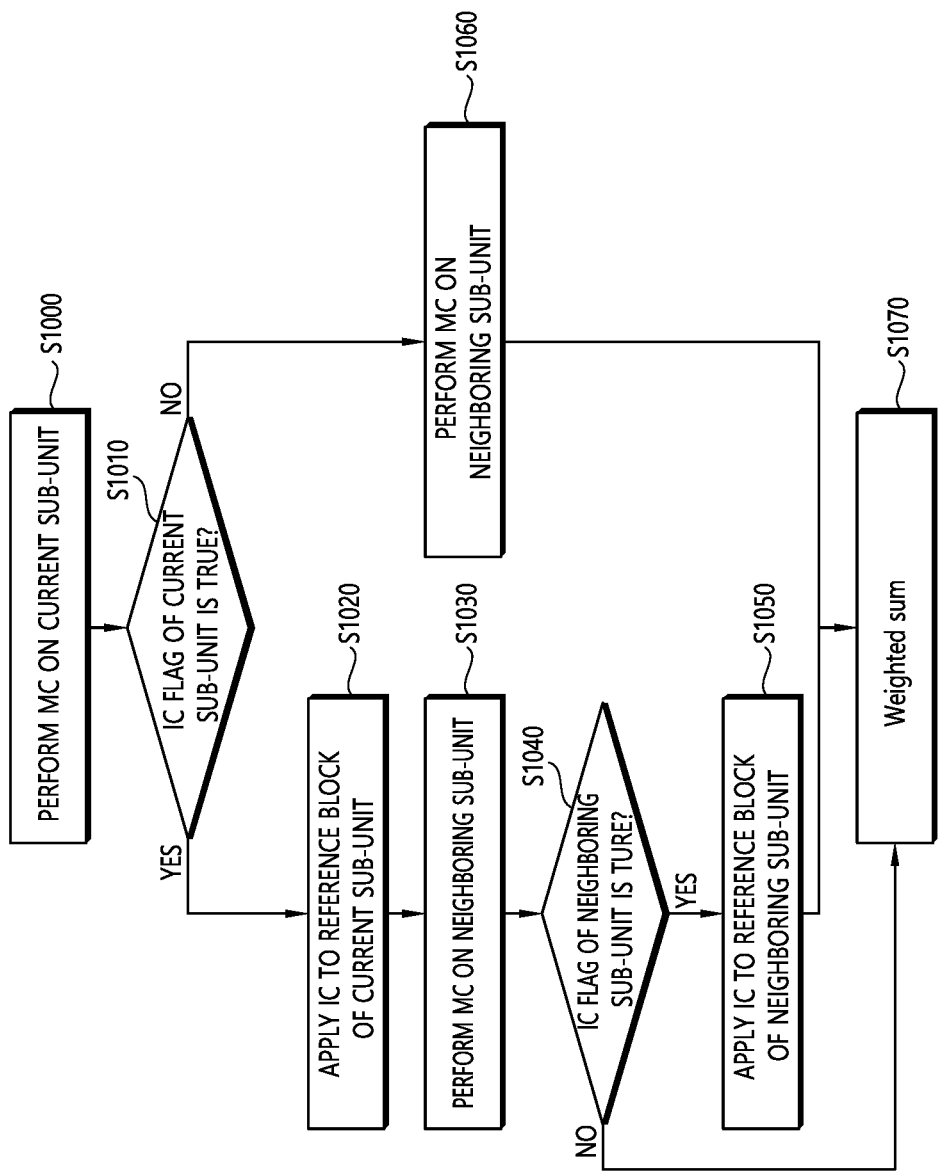

In this case, as illustrated in FIG. 10, the IC flag of the current block may be prioritized. In this case, the IC flag of the neighboring block may be considered depending on the IC flag of the current block.

Referring to FIG. 10, a coding device performs motion compensation (MC) on a current sub-unit of a current block to derive a reference block (first reference block) for the current sub-unit (S1000) and determines whether IC is applied to the current sub-unit based on the IC flag for the current sub-unit (S1010). The IC flag for the current sub-unit may be the same as the IC flag for the current block.

If IC is applied to the current sub-unit, the coding unit applies IC for the first reference block of the current sub-unit of the current block (S1020). Here, the first reference block is derived based on the current sub-unit and MV of the current block as described above.

The coding unit performs MC for the neighboring sub-unit to derive a reference block (second reference block) for the neighboring sub-unit (S1040). The coding unit determines whether IC is applied to the neighboring sub-unit based on the IC flag for the neighboring sub-unit (S1050). The IC flag for the neighboring sub-unit may be the same as the IC flag for the neighboring block including the neighboring sub-unit.

If the IC is applied to the neighboring sub-unit, the coding unit applies IC for the second reference block of the neighboring sub-unit (S1050). Here, the second reference block may correspond to a reference block located on the right side of the reference block derived based on the position of the neighboring sub-unit and the MV of the neighboring block (when the current sub-unit is adjacent to the left boundary of the current block) or located on the lower side (when the current sub-unit is adjacent to the upper boundary of the current block). Alternatively, the second reference block may correspond to a reference block derived based on the position of the current sub-unit and the MV of the neighboring block. In this case, the coding device may derive modified prediction samples for the corresponding current sub-unit through the weighted sum of the first reference block to which IC is applied and the second reference block to which IC is applied.

Meanwhile, if it is determined in step S1050 that IC is not applied to the neighboring sub-unit, the coding unit does not apply IC for the second reference block and may derive modified prediction samples for the current sub-unit through the weighted sum of the first reference block to which IC is applied and the second reference block to which IC is not applied.

Meanwhile, if it is determined in step S1010 that IC is not applied to the current sub-unit, the coding unit may perform MC on the neighboring sub-unit to derive a second reference block for the neighboring sub-unit (S1060), and here, the coding unit may skip the determination as to whether IC is applied to the neighboring sub-unit and derive the modified prediction samples for the current sub-unit through the weighted sum of the first reference block and the second reference block.

Figure 11:
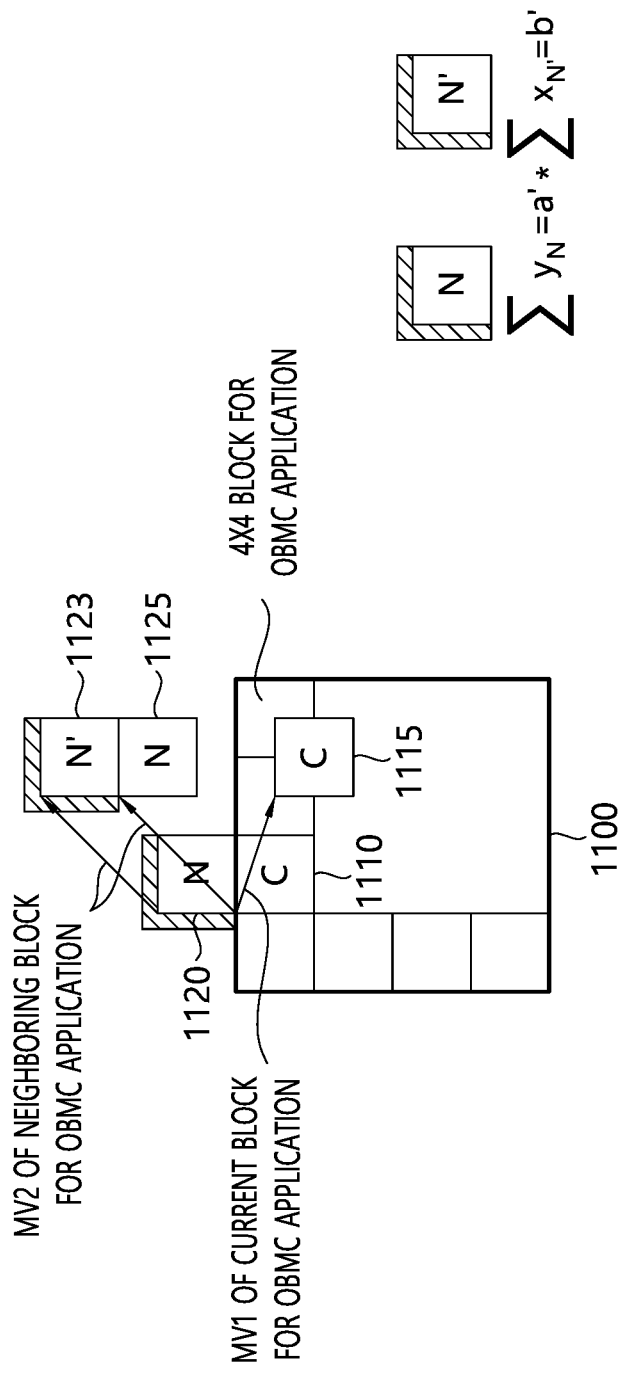
Figure 12:
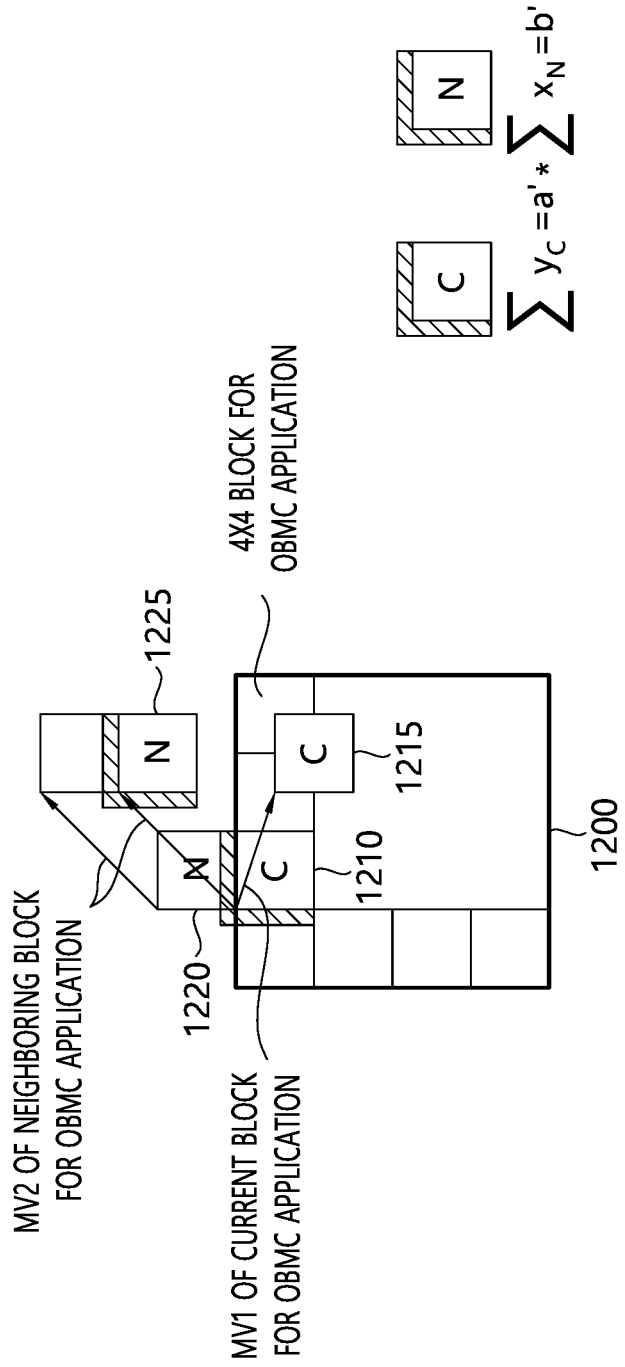

Meanwhile, FIGS. 11 and 12 illustrate a case where the IC flag of the current block is false and the IC flag of the neighboring block is true. In this case, OBMC may be performed by applying IC only to the second reference block without IC application to the first reference block. However, there is a difference in the neighboring samples used for deriving an IC parameter for the second reference block.

Referring to FIG. 11, an IC parameter is calculated based on neighboring samples of a neighboring sub-unit 1120 and neighboring samples of a third reference block 1123 derived based on the neighboring sub-unit 1120 and MV2 of the neighboring block. The calculated IC parameter may be applied to a second reference block 1125 derived based on the current sub-unit 1110 and the MV2. The second reference block 1125 may be derived based on the current sub-unit 1110 and the MV2.

Meanwhile, referring to FIG. 12, an IC parameter is calculated based on neighboring samples of a current sub-unit 110 and neighboring samples of a second reference block 1225 derived based on the current sub-unit 1210 and MV2 of a neighboring block. The calculated IC parameter may be applied to the second reference block 1225. The second reference block 1225 may be derived based on the current sub-unit 1210 and the MV2.

According to the method described above with reference to FIGS. 11 and 12, the first reference blocks 1115 and 1215 and the second reference blocks 1125 and 1225 may be weighted-summed as follows. In this case, IC may not be applied to the first reference block as illustrated in the following equation.

$$w \cdot (x_C) + (1-w) \cdot (a' \cdot x_N + b') \quad \text{[Equation 10]}$$

Here, a' denotes a scaling factor of the IC parameter, b' denotes an offset of the IC parameter, $x_C$ denotes a sample in the first reference blocks 1115 and 1215, and $x_N$ denotes a corresponding sample in the second reference blocks 1125 and 1225, and w denotes a weighting factor. The weighting factor may be determined to be different in units of rows/columns based on distances from a target boundary.

Figure 13:
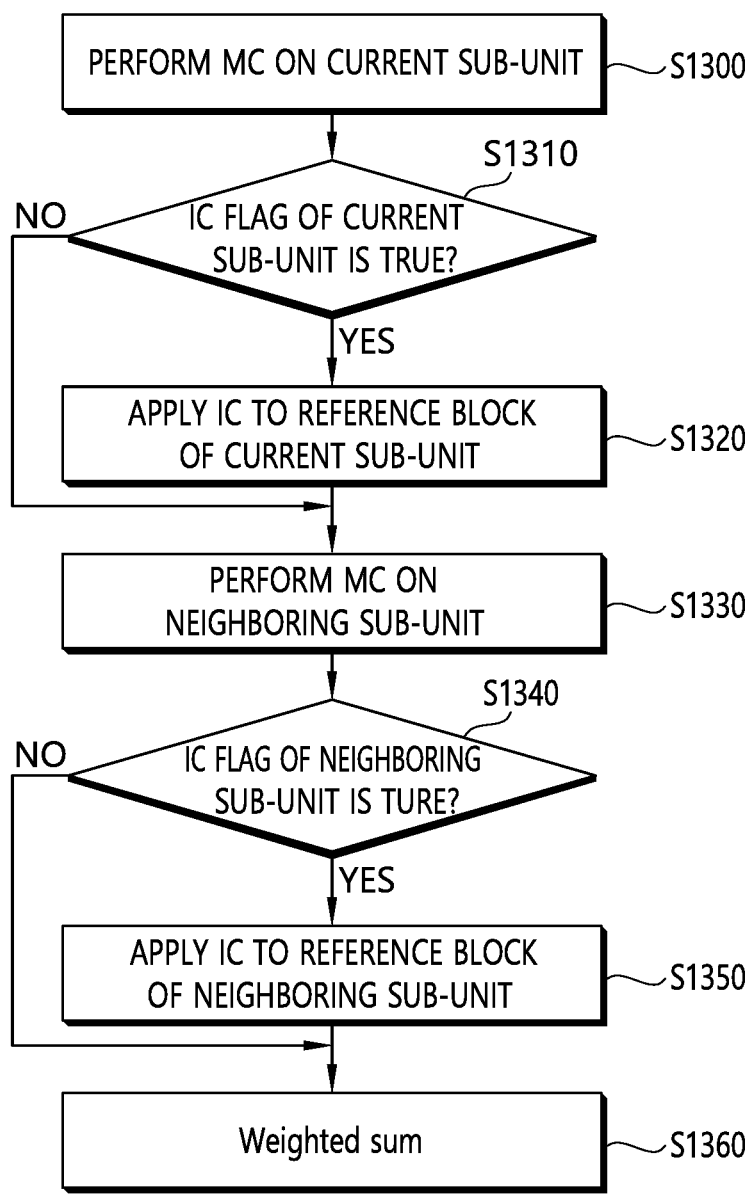

Meanwhile, in this case, as illustrated in FIG. 13, the IC flag of the neighboring block may be considered to be independent from the IC flag of the current block.

Referring to FIG. 13, the coding device performs motion compensation (MC) on a current sub-unit of a current block to derive a reference block (first reference block) for the current sub-unit (S1300) and determines whether IC is applied to the current sub-unit based on the IC flag for the current sub-unit (S1310). The IC flag for the current sub-unit may be the same as the IC flag for the current block.

If IC is applied to the current sub-unit, the coding unit applies IC for the first reference block of the current sub-unit of the current block (S1320). Here, the first reference block is derived based on the current sub-unit and MV of the current block as described above.

The coding unit performs MC for the neighboring sub-unit to derive a reference block (second reference block) for the neighboring sub-unit (S1330). The coding unit determines whether IC is applied to the neighboring sub-unit based on the IC flag for the neighboring sub-unit (S1340). Step S1340 may be performed not only when the IC flag of the current sub-unit is true but also when the IC flag is false. The IC flag for the neighboring sub-unit may be the same as the IC flag for the neighboring block including the neighboring sub-unit.

If the IC is applied to the neighboring sub-unit, the coding unit applies IC for the second reference block of the neighboring sub-unit (S1350). Here, the second reference block may correspond to a reference block located on the right side of the reference block derived based on the position of the neighboring sub-unit and the MV of the neighboring block (when the current sub-unit is adjacent to the left boundary of the current block) or located on the lower side (when the current sub-unit is adjacent to the upper boundary of the current block). Alternatively, the second reference block may correspond to a reference block derived based on the position of the current sub-unit and the MV of the neighboring block. In this case, the coding device may derive modified prediction samples for the corresponding current sub-unit through the weighted sum of the first reference block to which IC is applied and the second reference block to which IC is applied (S1360).

Meanwhile, if it is determined that IC is applied to the current sub-unit in step S1310 and that IC is not applied to the neighboring sub-unit in step S1340, the coding unit does not apply IC for the second reference block and may derive modified prediction samples for the current sub-unit through the weighted sum of the first reference block to which IC is applied and the second reference block to which IC is not applied.

Meanwhile, if it is determined that IC is not applied to the current sub-unit in step S1310 and that the IC is applied to the neighboring sub-unit in step S1340, the coding unit may derive modified prediction samples for the corresponding current sub-unit through the weighted sum of the first reference block and the second reference block to which IC is applied.

Meanwhile, if it is determined that IC is not applied to the current sub-unit in step S1310 and that IC is not applied to the neighboring sub-unit in step S1340, the coding unit may derive modified prediction samples for the corresponding current sub-unit through the weighted sum of the first reference block and the second reference block.

Figure 14:
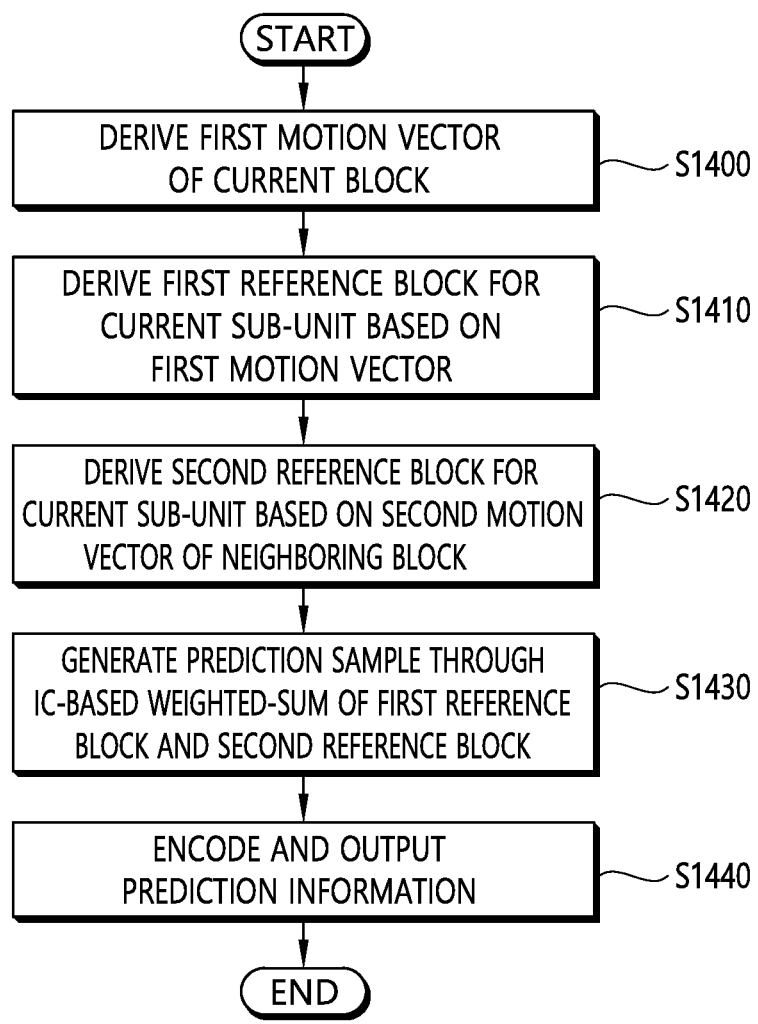
FIG. 14 schematically illustrates an example of an inter-prediction method in image encoding according to the present invention.

FIG. 14 schematically illustrates an example of an inter-prediction method in image encoding according to the present invention. The method disclosed in FIG. 14 may be performed by the encoding device disclosed in FIG. 1 Specifically, for example, steps S1400 to S1430 of FIG. 14 may be performed by the predictor of the encoding device and step S1440 may be performed by the entropy encoder of the encoding device.

Referring to FIG. 14, the encoding device detects a reference block for a current block and derives a first motion vector for the current block (S1400). The encoding device may search a reference block having an optimal rate-distortion (RD) cost from a reference picture through a motion estimation procedure and derive the motion vector indicating the reference block based on a position of the current block and a position of the reference block. The motion vector may be signaled to a decoding device according to a procedure defined according to an inter-prediction mode (e.g., merge mode, MVP mode, etc.) of the current block.

The encoding device derives a first reference block (array of reference samples) for a current sub-unit based on the first motion vector (S1410). The encoding device may derive the current sub-unit of the current block to perform OBMC according to the present invention, and the current sub-unit may be located within the current block and may be located adjacent to a target boundary of the current block. The encoding device may derive, as a first reference block, a block at a position indicated by the first motion vector based on the position of the current sub-unit on the reference picture. The first reference block has the same size as the current sub-unit and includes first reference samples. The first reference samples are used for prediction of the current block so the first reference samples may be referred to as first prediction samples.

The encoding device derives a second reference block (array of reference samples) for the current sub-unit based on a second motion vector of a neighboring block (S1420). The neighboring block may be located adjacent to the target boundary. The encoding device may derive, as a second reference unit, a reference unit at a position indicated by the second motion vector based on the position of the current sub-unit on the reference picture. The second reference unit has the same size as the current sub-unit and includes second reference samples. The second reference samples are used for prediction of the current block so the second reference samples may be referred to as second prediction samples.

The encoding device generates prediction samples through the IC-based weighted sum of the first reference block and the second reference block (S1430). That is, the encoding device may derive prediction samples through the IC-based weighted sum of the first reference samples (first prediction samples) and the second reference samples (second prediction samples). In this case, the first reference samples (first prediction samples) and the second reference samples (second prediction samples) may be weighted-summed in units of samples based on a phase. The prediction samples may be prediction samples located in the current sub-unit among the prediction samples for the current block. The procedure of S1410 to S1430 may be performed sequentially or concurrently on a plurality of sub-units located at the target boundary of the current block.

The encoding device may determine whether IC is applied to the current block. The encoding device may determine whether to apply IC to the current block based on a predefined condition and an RD cost. If it is determined that IC is applied to the current block, the encoding device may set a value of an IC flag for the current block to 1. If it is determined that IC is not applied to the current block, the encoding device may set the value of the IC flag for the current block to 0.

When it is determined that the IC is applied to the current block, that is, when the value of the IC flag is 1, the encoding device may derive a first IC parameter and a second IC parameter and perform IC-based weighted summing based on the first IC parameter and the second IC parameter.

In an example, the first IC parameter may be derived based on neighboring samples of the current sub-unit and neighboring samples of the first reference block, and the second IC parameter may be derived based on the neighboring samples of the current sub-unit and neighboring samples of the second reference block. In this case, the IC-based weighted summing may be performed based on Equation 6 described above.

In another example, the first IC parameter may be derived based on the neighboring samples of the current sub-unit and the neighboring samples of the first reference block, and the second IC parameter may be derived from neighboring samples of the neighboring sub-unit and neighboring samples of a third reference block. Here, the neighboring sub-unit may be located adjacent to the current sub-unit and located in the neighboring block, and the third reference block may be derived based on the neighboring sub-unit and the second motion vector. In this case, the IC-based weighted-summing may be performed based on Equation 7 described above.

In another example, the first IC parameter may be derived based on the neighboring samples of the current sub-unit and the neighboring samples of the first reference block, and the second IC parameter may be the same as the first IC parameter. In this case, the IC-based weighted summing may be performed based on Equation 8 described above.

Meanwhile, when the value of the IC flag of the current block is 1 and the value of the IC flag of the neighboring block is 0, the encoding device may derive the first IC parameter and may not derive the second IC parameter. In this case, in performing the IC-based weighted-summing, the samples in the first reference block may be illumination-compensated based on the first IC parameter and weighted-summed with the samples in the second reference block. In this case, the IC-based weighted-summing may be performed based on Equation 9 described above.

Meanwhile, if the value of the IC flag of the current block is 0 and the value of the IC flag of the neighboring block is 1, the encoding device may derive the second IC parameter without deriving the first IC parameter. In this case, in performing the IC-based weighted-summing, the samples in the first reference block may be weighted-summed with the samples in the second reference block which are illumination-compensated based on the second IC parameter. In this case, the IC-based weighted-summing may be performed based on Equation 10 described above.

The encoding device encodes and outputs prediction information (S1440). The prediction information may include information on the motion vector of the current block. For example, the information on the motion vector may include a merge index, or the like, for the current block. In another example, the information on the motion vector may include an MVP flag and motion vector difference (MVD) information. In addition, the prediction information may include inter-prediction mode information of the current block. The prediction information may include the IC flag.

Figure 15:
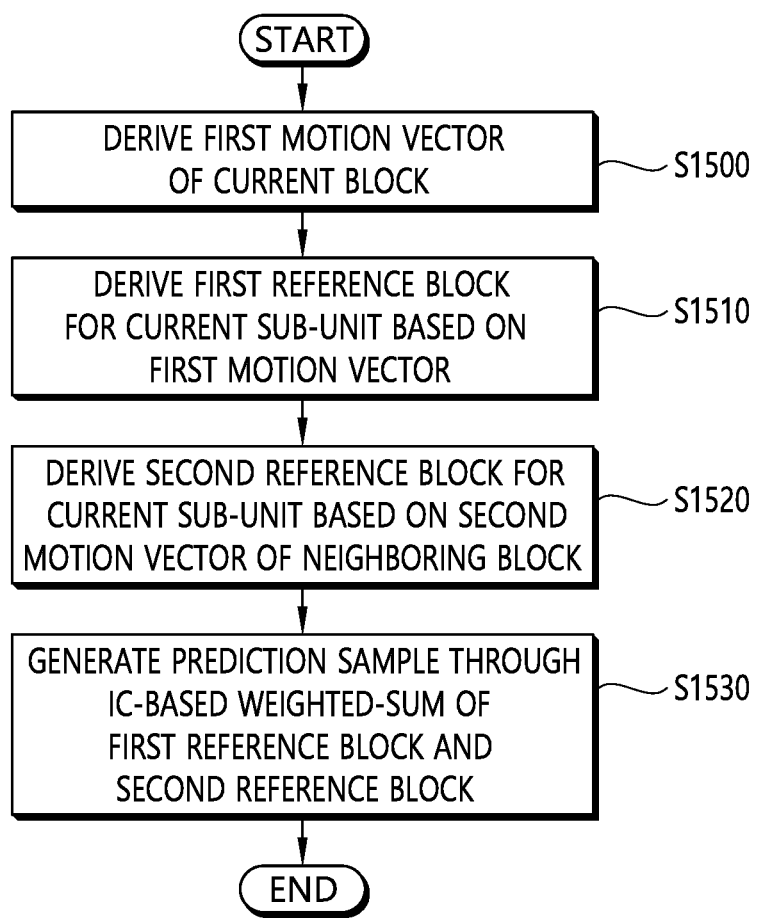
FIG. 15 schematically illustrates an example of an inter-prediction method in image decoding according to the present invention.

The encoding device may encode the prediction information and output the same as a bitstream. The bitstream may be transmitted to a decoding device via a network or a storage medium FIG. 15 schematically illustrates an example of an inter-prediction method in image decoding according to the present invention. The method disclosed in FIG. 15 may be performed by the decoding device disclosed in FIG. 2 Specifically, for example, steps S1500 to S1530 in FIG. 15 may be performed by the predictor of the decoding device.

Referring to FIG. 15, the decoding device derives a first motion vector of a current block (S1500). The decoding device may derive the motion vector from the current block based on the prediction information acquired through the bitstream. The bitstream may be received from an encoding device via a network or a storage medium. For example, the decoding device may generate a merge candidate list based on neighboring blocks of the current block and derive, as the motion vector, a motion vector of a merge candidate selected from the merge candidate list using a merge index included in the prediction information. In another example, the decoding device may generate an MVP candidate list based on neighboring blocks of the current block, select a specific MVP candidate based on an MVP flag included in the inter-prediction information, and derive the motion vector using a motion vector of the selected MVD candidate and MVD derived from the MVD information included in the prediction information.

The decoding device derives a first reference block (array of reference samples) for a current sub-unit based on the first motion vector (S1510). The decoding device may derive the current sub-unit of the current block to perform OBMC according to the present invention, and the current sub-unit may be located within the current block and may be located adjacent to the target boundary of the current block. The decoding device may derive, as a first reference block, a block at a position indicated by the first motion vector based on a position of the current sub-unit on a reference picture. The first reference block has the same size as the current sub-unit and includes first reference samples. The first reference samples are used for prediction of the current block so the first reference samples may be referred to as first prediction samples.

The decoding device derives a second reference block (array of reference samples) for the current sub-unit based on a second motion vector of a neighboring block (S1520). The neighboring block may be located adjacent to the target boundary. The decoding device may derive, as a second reference unit, a reference unit at a position indicated by the second motion vector based on the position of the current sub-unit on the reference picture. The second reference unit has the same size as the current sub-unit and includes second reference samples. The second reference samples are used for prediction of the current block so the second reference samples may be referred to as second prediction samples.

The decoding device generates prediction samples through the IC-based weighted sum of the first reference block and the second reference block (S1530). That is, the decoding device may derive prediction samples through the IC-based weighted sum of the first reference samples (first prediction samples) and the second reference samples (second prediction samples). In this case, the first reference samples (first prediction samples) and the second reference samples (second prediction samples) may be weighted-summed in units of samples based on a phase. The prediction samples may be prediction samples located in the current sub-unit among the prediction samples for the current block. The procedure of S1410 to S1430 may be performed sequentially or concurrently on a plurality of sub-units located at the target boundary of the current block.

When it is determined that the value of the IC flag is 1, the decoding device may derive a first IC parameter and a second IC parameter and perform IC-based weighted summing based on the first IC parameter and the second IC parameter.

In an example, the first IC parameter may be derived based on neighboring samples of the current sub-unit and neighboring samples of the first reference block, and the second IC parameter may be derived based on the neighboring samples of the current sub-unit and neighboring samples of the second reference block. In this case, the IC-based weighted summing may be performed based on Equation 6 described above.

In another example, the first IC parameter may be derived based on the neighboring samples of the current sub-unit and the neighboring samples of the first reference block, and the second IC parameter may be derived from neighboring samples of the neighboring sub-unit and neighboring samples of a third reference block. Here, the neighboring sub-unit may be located adjacent to the current sub-unit and located in the neighboring block, and the third reference block may be derived based on the neighboring sub-unit and the second motion vector. In this case, the IC-based weighted-summing may be performed based on Equation 7 described above.

In another example, the first IC parameter may be derived based on the neighboring samples of the current sub-unit and the neighboring samples of the first reference block, and the second IC parameter may be the same as the first IC parameter. In this case, the IC-based weighted summing may be performed based on Equation 8 described above.

Meanwhile, when the value of the IC flag of the current block is 1 and the value of the IC flag of the neighboring block is 0, the decoding device may derive the first IC parameter and may not derive the second IC parameter. In this case, in performing the IC-based weighted-summing, the samples in the first reference block may be illumination-compensated based on the first IC parameter and weighted-summed with the samples in the second reference block. In this case, the IC-based weighted-summing may be performed based on Equation 9 described above.

Meanwhile, if the value of the IC flag of the current block is 0 and the value of the IC flag of the neighboring block is 1, the decoding device may derive the second IC parameter without deriving the first IC parameter. In this case, in performing the IC-based weighted-summing, the samples in the first reference block may be weighted-summed with the samples in the second reference block which are illumination-compensated based on the second IC parameter. In this case, the IC-based weighted-summing may be performed based on Equation 10 described above.

Meanwhile, although not illustrated, the decoding device may receive residual information on residual samples of the current block from the bitstream. The residual information may include transform coefficients relating to residual samples.

The decoding device may derive the residual sample (or residual sample array) for the current block based on the residual information. The decoding device may generate a reconstructed sample based on the prediction sample and the residual sample and derive a reconstructed block or a reconstructed picture based on the reconstructed sample. Thereafter, the decoding device may apply an in-loop filtering procedure such as deblocking filtering and/or SAO procedure to the reconstructed picture in order to improve subjective/objective image quality as necessary.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor.

The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An inter-prediction method performed by a decoding device, the method comprising:
    deriving a first motion vector of a current block;
    deriving a first reference block for a current sub-unit of the current block based on the first motion vector, wherein the current sub-unit is adjacent to a target boundary of the current block;
    deriving a second reference block for the current sub-unit based on a second motion vector of a neighboring block adjacent to the target boundary; and
    generating prediction samples based on an illumination compensation (IC) based weighted-sum using the first reference block and the second reference block,
    wherein when a value of an IC flag of the current block is 1 and a value of an IC flag of the neighboring block is 0, a first IC parameter is derived and in the performing of IC-based weighted-summing, a sample in the first reference block is illumination-compensated based on the first IC parameter and weighted-summed with a sample in the second reference block,
    wherein when a value of an IC flag of the current block is 0 and a value of an IC flag of the neighboring block is 1, a second IC parameter is derived and in the performing of IC-based weighted-summing, a sample in the first reference block is weighted-summed with a sample in the second reference block which is illumination-compensated based on the first IC parameter.

2. The inter-prediction method of claim 1, wherein the first IC parameter is derived based on neighboring samples of the current sub-unit and neighboring samples of the first reference block, and the second IC parameter is derived based on the neighboring samples of the current sub-unit and neighboring samples of the second reference block.

3. The inter-prediction method of claim 2, wherein the IC-based weighted-summing is performed based on the following equation: $w \cdot (a \cdot x_C + b) + (1-w) \cdot (a' \cdot x_N + b')$ wherein a is a scaling factor of the first IC parameter, b is an offset of the first IC parameter, $x_C$ is a sample in the first reference block, a' is a scaling factor of the second IC parameter, b' is an offset of the second IC parameter, $x_N$ is a sample in the second reference block, and w is a weighting factor.

4. The inter-prediction method of claim 1, wherein the first IC parameter is derived based on neighboring samples of the current sub-unit and neighboring samples of the first reference block, the second IC parameter is derived based on neighboring samples of a neighboring sub-unit and neighboring samples of a third reference block, and the neighboring sub-unit is adjacent to the current sub-unit and located within the neighboring block, and the third reference block is derived based on the neighboring sub-unit and the second motion vector.

5. The inter-prediction method of claim 4, wherein the IC-based weighted-summing is performed based on the following equation: $w \cdot (a \cdot x_C + b) + (1-w) \cdot (a' \cdot x_N + b')$ wherein a is a scaling factor of the first IC parameter, b is an offset of the first IC parameter, $x_C$ is a sample in the first reference block, a' is a scaling factor of the second IC parameter, b' is an offset of the second IC parameter, $x_N$ is a sample in the second reference block, and w is a weighting factor.

6. The inter-prediction method of claim 1, wherein the first IC parameter is derived based on neighboring samples of the current sub-unit and neighboring samples of the first reference block, and the second IC parameter is the same as the first IC parameter.

7. The inter-prediction method of claim 6, wherein the IC-based weighted-summing is performed based on the following equation: $w \cdot (a \cdot x_C + b) + (1-w) \cdot (a' \cdot x_N + b')$ wherein a is a scaling factor of the first IC parameter, b is an offset of the first IC parameter, $x_C$ is a sample in the first reference block, $x_N$ is a sample in the second reference block, and w is a weighting factor.

8. The inter-prediction method of claim 1, wherein the IC-based weighted-summing is performed based on the following equation: $w \cdot (a \cdot x_C + b) + (1-w) \cdot (x_N)$ wherein a is a scaling factor of the first IC parameter, b is an offset of the first IC parameter, $x_C$ is a sample in the first reference block, $x_N$ is a sample in the second reference block, and w is a weighting factor.

9. The inter-prediction method of claim 1, wherein the IC-based weighted-summing is performed based on the following equation: $w \cdot (x_C) + (1-w) \cdot (a' \cdot x_N + b)$ wherein a' denotes a scaling factor of the second IC parameter, b' denotes an offset of the second IC parameter, $x_C$ denotes a sample in the first reference block, $x_N$ is a corresponding sample in the second reference block, and w is a weighting factor.

10. A decoding device for inter-prediction, the decoding device comprising:
    a receiving unit receiving an IC flag of a current block; and
    a predictor deriving a first motion vector of the current block, deriving a first reference block for a current sub-unit of the current block based on the first motion vector, wherein the current sub-unit is adjacent to a target boundary of the current block, deriving a second reference block for the current sub-unit based on a second motion vector of a neighboring block adjacent to the target boundary, and generating prediction samples based on an illumination compensation (IC) based weighted-sum using the first reference block and the second reference block,
    wherein when a value of an IC flag of the current block is 1 and a value of an IC flag of the neighboring block is 0, a first IC parameter is derived and in the performing of IC-based weighted-summing, a sample in the first reference block is illumination-compensated based on the first IC parameter and weighted-summed with a sample in the second reference block,
    wherein when a value of an IC flag of the current block is 0 and a value of an IC flag of the neighboring block is 1, a second IC parameter is derived and in the performing of IC-based weighted-summing, a sample in the first reference block is weighted-summed with a sample in the second reference block which is illumination-compensated based on the first IC parameter.

11. The decoding device of claim 10, wherein the first IC parameter is derived based on neighboring samples of the current sub-unit and neighboring samples of the first reference block, and the second IC parameter is derived based on the neighboring samples of the current sub-unit and neighboring samples of the second reference block.

* * * * *